United States Patent [19]
Hogue et al.

[11] 3,755,746
[45] Aug. 28, 1973

[54] FREQUENCY COMPARISON INDICATING APPARATUS

[75] Inventors: Noel E. Hogue, Cedar Rapids; Charles M. Dennison, Hiawatha, both of Iowa

[73] Assignee: Collins Radio Company, Dallas, Tex.

[22] Filed: Mar. 7, 1972

[21] Appl. No.: 232,460

[52] U.S. Cl. .................................. 328/133, 328/134
[51] Int. Cl. ............................................. H03d 13/00
[58] Field of Search ............................ 328/133, 134

[56] References Cited
UNITED STATES PATENTS

| | | | |
|---|---|---|---|
| 2,985,773 | 5/1961 | Dobbie | 328/133 X |
| 3,328,688 | 6/1967 | Brooks | 328/133 X |
| 3,354,398 | 11/1967 | Broadhead | 328/133 |
| 3,391,343 | 7/1968 | McCurdy | 328/133 |
| 3,431,509 | 3/1969 | Andrea | 328/133 X |
| 3,501,701 | 3/1970 | Reid | 328/134 |
| 3,515,997 | 6/1970 | Babany | 328/134 |
| 3,610,954 | 10/1971 | Treadway | 328/133 X |

*Primary Examiner*—John S. Heyman
*Attorney*—Bruce C. Lutz et al.

[57] ABSTRACT

A gating system for use with a frequency discriminator which will provide a positive indication of whether or not two input signals are the same frequency or, if they are not the same frequency, which one is the higher. The apparatus is for use with a frequency detector providing logic "1" and logic "0" outputs indicative of the highest frequency and providing an alternating output when the two frequencies are identical. The output of the frequency discriminator is utilized to steer flip-flops to provide the necessary positive outputs.

3 Claims, 2 Drawing Figures

PATENTED AUG 28 1973 3,755,746

FREQUENCY COMPARISON INDICATING APPARATUS

THE INVENTION

The present invention is related generally to electronics and more specifically to a frequency detection and selection system.

We wish to incorporate as a portion of the specification in this application the contents of U.S. Pat. No. 3,431,509 issued Mar. 4, 1969, in the name of J. J. Andrea and assigned to the same assignee as the present invention. The present invention operates in conjunction with a frequency discriminator of the type shown in the above-referenced patent to provide the positive logic outputs indicative of comparative frequencies of two different signals.

It is therefore an object of the present invention to provide an improved positive indicator for determining the frequency of one signal with respect to another.

Figure 1:
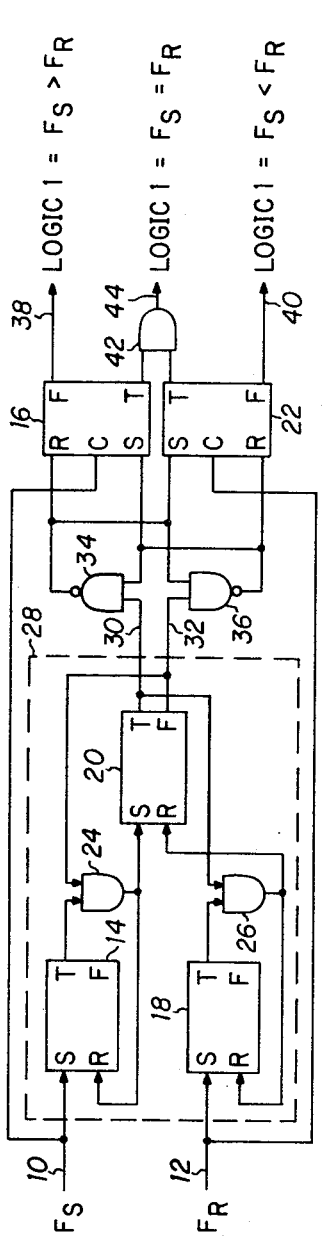
Figure 2:
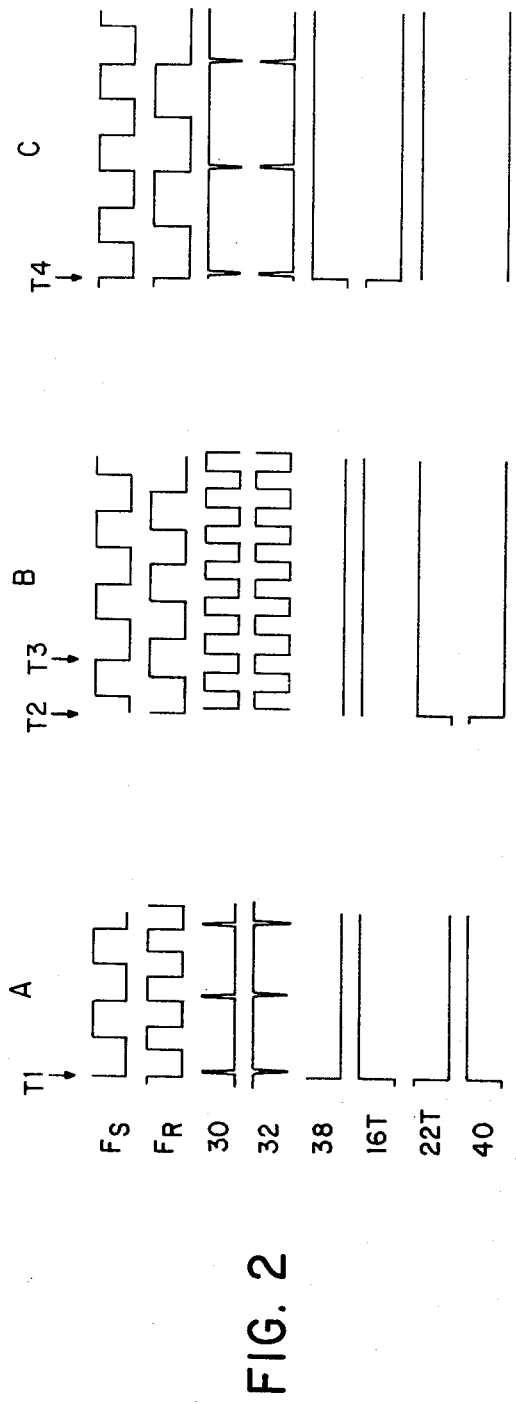

Other objects and advantages of the present invention may be ascertained from a reading of the specification and claims in conjunction with the drawings wherein:

FIG. 1 is a block schematic diagram of a preferred embodiment of the invention; and FIG. 2 is a collection of waveforms for use in explaining the opration of FIG. 1.

In FIG. 1 a pair of input terminals 10 and 12 labeled $F_s$ and $F_r$, respectively, individually provide a signal of an unknown frequency and a signal of a reference frequency. Terminal 10 is supplied to the S input of a standard RS flip-flop 14 and to a clock input of an RS steering flip-flop 16. The flip-flop 14 will change states upon the application of a logic 1 to either of said S or said R inputs with a logic 1 appearing at the true output only upon the application of a logic 1 at the S input. The flip-flop 16 on the other hand will change states only upon the simultaneous application of a negative going pulse at the clock input and a logic 0 at either of the R or S inputs. In other words, a negative going clock applied to 16 and a logic 0 at input R will produce a logic 1 at output F. On the other hand, with a negative going clock and a logic 0 at input S, a logic 1 will appear at output T. Flip-flop 14 operates in the same manner as further flip-flops 18 and 20 while flip-flop 16 operates in a manner similar to a flip-flop 22. A true output of flip-flop 14 is applied to one input of an AND gate 24 which receives a further input from a false output of flip-flop 20. An output of AND gate 24 is connected to the R input of flip-flop 14 and to the S input of flip-flop 20. The input 12 is connected to an S input of flip-flop 18 and to a clock input of flip-flop 22. A true output of flip-flop 18 is connected to one input of an AND gate 26 whose output is connected to an R input of flip-flop 18 and to an R input of flip-flop 20. The false outputs of flip-flops 14 and 18 are not connected to anything. The true output of flip-flop 20 is connected to a second input of AND gate 26. The flip-flops 14-20 and AND gates 24-26 are contained within a dash line generally indicated as 28. This dash line represents the contents of the frequency discriminator as shown in the above-referenced Andrea patent. A first output of this dash line block which has inputs of the two frequency signals 10 and 12, appear as output leads 30 and 32. Output lead 30 is connected to the true output of flip-flop 20 and is connected to an input of a NAND gate 34. Lead 32 is connected to the false output of flip-flop 20 and to an input of NAND gate 36. An output of NAND gate 36 is connected to a second input of NAND gate 34, an S input of flip-flop 16 and to an R input of flip-flop 22. The output of NAND gate 34 is connected to an R input of flip-flop 16, a second input of NAND gate 36 and to an S input of flip-flop 22. A first apparatus output 38 is connected to the F or false output of flip-flop 16 and provides an indication of logic 1 when the signal frequency is higher than the reference frequency. An F output of flip-flop 22 designated as 40 provides a logic 1 output when the signal frequency is lower than the reference frequency. The two true outputs of flip-flops 16 and 18 are connected to inputs of an AND gate 42 which has an output 44. Output 44 is a logic 1 when both of the signals supplied on leads 10 and 12 are identical in frequency.

It may be noted in FIG. 2 that the various waveforms are generally labeled with designations utilized in FIG. 1. The exceptions are the second and third waveforms from the bottom which are labeled 16T indicating the true output of flip-flop 16 and 22T indicating the true output of flip-flop 22.

In operation, as may be ascertained from the description in the above-referenced Andrea patent, the frequency discriminator 28 checks the two input signals applied on 10 and 12. Column A in FIG. 2 provides the example of the frequency on lead 10 being lower than the frequency on lead 12. This is illustrated by the waveforms $F_s$ and $F_r$. As indicated in the patent, the output on leads 30 and 32 are a substantially continuous logic 0 or logic 1. Specifically, as indicated in the referenced patent, the very narrow pulses operate to raise or lower the average DC level of the output signal appearing on these leads only a negligible amount. Further, these pulses occur shortly after the negative going portion of the lowest frequency of the two input signals. Thus, at the time the lowest frequency signal is going from a positive to a negative value, the output signal is actually at its substantially constant logic level.

For convenience in circuit explanation, the reference and signal frequencies are illustrated as going negative at the same explanation times in the columns A and C. In actuality this would not normally occur but there would still be no effect on the resultant output signal.

Column B illustrates, as shown in the referenced patent, that the output of frequency discriminator 28 is an alternating signal when the two input signals are the same frequency. Finally, column C illustrates that the output lead 30 is of the opposite logic level or in other words substantially a logic 1 when the signal frequency is higher than the reference frequency.

For the explanation of the reference frequency being higher than the signal frequency, the previous circuit conditions will be assumed to be as shown at the output of flip-flops 16 and 22 in column C. In other words terminals 38 and 22T will be logic 1 and terminals 16T and 40 will be logic 0. Immediately prior to time T1, lead 30 would be a logic 0 and lead 32 would be a logic 1. The logic 0 on lead 30 would render NAND gate 34 inoperative and there would be a logic 1 on the output as applied to the R and S inputs of flip-flops 16 and 22, respectively, and to the input of NAND gate 36. Since NAND gate 36 also receives a logic 1 on the lead 32, it provides a logic 0 output. The negative going trailing edge of the signal $F_s$ will cause flip-flop 16 to flip and alter the polarity of the outputs such that lead 38 will be a logic 0. Since this lead is a logic 0, it indicates that the reference frequency is either equal to or higher than the signal frequency. The logic 0 at the R input of flip-flop 22 at the time that the signal $F_r$ is falling in amplitude level will switch flip-flop 22 so that its F output lead 40 changes to a logic 1. This, of course, provides the indication that the reference frequency is higher than the signal frequency. The appearance of the indicated logic levels on 38 and 40 require that there be a logic 1 on lead 16T and a logic 0 on 22T thereby keeping AND gate 42 inactive and preventing a logic 1 from appearing on output lead 44.

As shown in column B, it will be noted from the above-referenced patent that the use of the frequency discriminator in a phase locked loop stabilized the system so that the signal and reference frequencies were 90° displaced. This is not a necessary condition to the operation of the present circuit but was shown in this manner for illustrative purposes and to minimize the required disclosure of prior art.

While the two frequencies could occur at exactly the same phase and prevent the output from alternating, in a non-phase locked system, this is a very unlikely occurrence and can be ignored for the purpose of the present explanation. The use of the present detection system in a phase-locked system whereby the reference and the other signal were both the same frequency and temporarily the same phase to result in a single logic level at the output of the discriminator would provide a feedback signal to change the frequency of the monitored signal and in such an attempt the phase would be changed to restore an alternating output before the frequency was changed enough to cause problems.

For the above reasons, the output from the frequency discriminator 28 can be assumed to be the alternating signal illustrated in column B of FIG. 2. As will be noted, the change in amplitude levels of the waveforms 30 and 32 in column B occur slightly after the change in amplitude levels of the two signals $F_s$ and $F_r$.

Following through the same logic sequence as illustrated in column A, it will be noted that at time T2 a logic 0 is applied to NAND gate 36 thereby supplying two logic 1's to the input of NAND gate 34. Thus, NAND gate 34 will supply a logic 0 to the R input of flip-flop 16 and the S input of flip-flop 22. At time T2 the $F_r$ input is going negative and will trigger flip-flop 22. This will change the states of the output terminals so that lead 40 is now a logic 0 and the true output is a logic 1. Assuming that the system advanced from the conditions in column A to column B, AND gate 42 would now have two logic 1 inputs and would provide an output indicating the two frequencies are the same. However, if the system were to have advanced from a previous condition such as shown in C, the device, at time T3, would have a logic 0 being applied to NAND gate 34. Thus, logic 1's would be provided to the two inputs of NAND gate 36. The output of NAND gate 36 provides logic 0's to the S input of flip-flop 16 and the R input of 22. Thus, upon the negative going edge of the signal on lead 10, flip-flop 16 will be clocked and if the output T of flip-flop 16 is not already a logic 1, the flip-flop 16 will be altered in state to make it a logic 1.

In view of the above explanations, it may be ascertained that when the frequencies supplied on leads 10 and 12 are identical, alternating outputs are obtained on leads 30 and 32 and gates 34 and 36 thus produce logic 1's from the T outputs of flip-flops 16 and 22 so that a logic 1 output appears only on lead 44 and not on 38 and 40.

In the situation where the signal on lead 10 is a higher frequency than the frequency of the signal on lead 12, the conditions in column C will occur. Utilizing the same logic utilized in columns A and B, it will be noted that NAND gate 36 provides a logic 1 output and NAND gate 34 provides a logic 0 output. Thus, upon the negative edge of the $F_s$ signal as shown at time T4, flip-flop 16 will change if it had recently been in a condition as shown in column B and will provide an output on lead 38 indicating that the reference frequency is now lower than the signal frequency.

As will be well known to those skilled in the art, the frequency discriminator 28 can be produced in various ways and the Andrea patent is merely referenced as one convenient form of implementing a discriminator which will provide the signals necessary for the present frequency detection and selection system. While the Andrea patent is shown applied in a phase locked loop system, the apparatus described will operate to provide an indication anytime it is desired to compare two frequencies and provide an indication of which one, if either, is the higher frequency.

Further, there are various methods in which the apparatus of the present invention can be implemented and we therefore wish to be limited not by the apparatus disclosed in the present application but only by the scope of the claims wherein, we claim:

1. Apparatus as the class described comprising, in combination:

signal supply first means for supplying first and second signals representative of first and second frequencies, respectively;

first detection means, including first and second inputs and first and second outputs, connected to said signal supply first means for receiving said first and second signals therefrom, said first detection means supplying a substantially continuous first logic level at said first output when said first signal as received is a higher frequency than said second signal and supplying the opposite, substantially continuous second logic level at said first output when said first frequency is lower than said second frequency, said first output supplying an alternating signal when said first and second signals are of the same frequency and said second output supplying a logic level which is the same frequency but inverted with respect to the logic level of the signal supplied at said first output; and second detection means connected to said output means of said first detection means and to said signal supply first means, said second detection means including first, second, and third output means, a given logic level appearing at only one of said first, second, and third outputs at a given time and said logic level being indicative, respectively, of the first signal being of a higher frequency than said second signal, said first signal being equal in frequency to said second signal and the first signal being of a lower frequency than said second signal.

2. Apparatus as claimed in claim 1 wherein said second detecting means comprises, in combination:

first and second NAND gates each having first and second inputs and an output;

first and second RS flip-flop means each including R and S inputs, clock inputs and true and false outputs;

means connecting said first output of said first detection means to said first input of said NAND gate and said second output of said first detection means to said first input of said second NAND gate;

means connecting the output of said first NAND gate to said R input of said first flip-flop, said S input of said second flip-flop and said second input of said second NAND gate;

means connecting said output of said second NAND gate to said R input of said second flip-flop, said S input of said first flip-flop and said second input of said first NAND gate;

means connecting said signal supply first means to said flip-flop means whereby said first signal is supplied to the clock input of said first flip-flop and said second signal is supplied to said clock input of said second flip-flop;

means connecting said false outputs of said first and second flip-flops, respectively, to said first and third outputs of said second detection means, respectively; and means supplying the logical AND of said true outputs of said first and second flip-flops to said second output means of said second detection means.

3. Apparatus of the class described comprising, in combination:

first and second NAND gate means each including first and second input means and output means;

AND gate means including first and second input means and output means;

steered first and second flip-flop means each including set and reset inputs, true and false outputs and clocking inputs;

first and second steering input signal supplying means;

means connecting said first and second steering input signal supplying means to said clock inputs of said first and second flip-flops respectively;

means connecting said output means of said first NAND gate means to the first input of said second NAND gate means, to the reset input of said first flip-flop means and to the set input of said second flip-flop means;

means connecting the output of said second NAND gate means to the first input of said first NAND gate means, the set input of said first flip-flop means and the reset input of said second flip-flop means;

means connecting the true outputs of said first and second flip-flop means to the first and second inputs of said AND gate means;

first and second logic level signal supplying means connected to the second input means of said first and second NAND gate means, respectively; and output means connected to the output means of said AND gate means and to the false outputs of said first and second flip-flops.

* * * * *